(12) United States Patent
Cavacece et al.

(10) Patent No.: US 11,879,804 B2
(45) Date of Patent: Jan. 23, 2024

(54) METHOD OF THERMAL ANALYSIS OF A BEARING UNIT

(71) Applicant: Aktiebolaget SKF, Gothenburg (SE)

(72) Inventors: Fabio Cavacece, Rome (IT); Fabio Falaschi, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/352,420

(22) Filed: Jun. 21, 2021

(65) Prior Publication Data

US 2021/0404911 A1 Dec. 30, 2021

(30) Foreign Application Priority Data

Jun. 25, 2020 (IT) .................. 102020000015169

(51) Int. Cl.
| | | |
|---|---|---|
| *G01M 13/04* | (2019.01) | |
| *F16C 19/52* | (2006.01) | |
| *G01N 25/00* | (2006.01) | |
| *G01K 7/42* | (2006.01) | |

(52) U.S. Cl.
CPC .......... *G01M 13/04* (2013.01); *F16C 19/525* (2013.01); *G01N 25/00* (2013.01); *G01K 7/427* (2013.01)

(58) Field of Classification Search
CPC ...... G01M 13/04; G01N 25/00; F16C 19/525; G01K 7/42; G01K 7/427
See application file for complete search history.

(56) References Cited

U.S. PATENT DOCUMENTS

2019/0055989 A1\* 2/2019 Hamada .................. F16C 19/38

FOREIGN PATENT DOCUMENTS

DE 102010044899 3/2011

OTHER PUBLICATIONS

Wu, Li et al. "Thermal Characteristic Analysis and Experimental Study of a Spindle-Bearing System", Entropy 2016, vol. 18; www.mdpi.com/journal/entropy.\*
SKF; "Sealed SKF Explorer Spherical Roller Bearings"; Mar. 1, 2015; pp. 1-2; retrieved from www.skf.com/binaries/pub12/Images/0901d1968054df0d-15587-Why-SKF-Sealed-SRB_30Aug-lowres_tcm_12-281481.

(Continued)

*Primary Examiner* — Manuel L Barbee
(74) *Attorney, Agent, or Firm* — Reed Smith LLP

(57) ABSTRACT

Thermal analysis of a bearing unit, carried out by entering the input and boundary conditions of the application, defining contact areas and load distribution between components of the bearing unit, calculating the conduction resistances and the thermal convection of the components, calculating the heat generated by friction between the components in contact and the heat distribution thereof on a plurality of isothermal nodes which discretize the bearing unit, defining a thermal interaction between the isothermal nodes, thermally balancing the isothermal nodes, calculating the temperature range of the bearing unit, comparing the resulting operating temperature on an isothermal node of a sealing means of the bearing unit and the related maximum allowable temperature, and if the operating temperature and maximum allowable temperature values are different from each other, repeat steps (a) to step (h).

18 Claims, 6 Drawing Sheets

(56) References Cited

OTHER PUBLICATIONS

De-Xing Zheng et al.; "An Optimized Thermal Network Model to Estimate Thermal Performances on a Pair of Angular Contact Ball Bearings Under Oil-Air Lubrication"; Applied Thermal Engineering, Pergamon, Oxford, GB, vol. 131, Dec. 5, 2017.
Search Report for corresponding Italian Patent Application No. 2020000015169 dated Feb. 26, 2021.

* cited by examiner

Fig. 5

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | A |
|---|---|---|---|---|---|---|---|---|---|---|---|---|---|---|---|---|---|---|---|---|---|---|---|---|---|---|---|
| 1 | | Ca | Cr | | | | | | | | | | | | | | | | | | | | | | | | |
| 2 | Ca | | | Cr | | | | | | | | | | | | | | | | | | | | | | | V_air |
| 3 | Cr | | Ca | | Cr | | | | | | | | | | | | | | | | | | | | | | |
| 4 | | Cr | | Ca | Cr | | | | | | | | | | | | | | | | | | | | | | V_air |
| 5 | | | Cr | Ca | | Hg Ca V_oil | Cr | | | | | | | | | | | | | | | | | | | | |
| 6 | | | | Cr | V_oil | V_oil | V_oil | | | | | | | | | | | | | | | | | | | | V_air |
| 7 | | | | | Cr | | V_oil | | | | | | | | | | | | | | | | | | | | |
| 8 | | | | | | | V_oil | Cr | V_oil | V_oil | | | | | | | | | | | | | | | | | |
| 9 | | | | | | | | V_oil Cr Hg | Ca | | | | | | | | | | | | | | | | | | V_air |
| 10 | | | | | | | | Cr | Ca | | | | | | | | | | | Ca | | | | | | | |
| 11 | | | | | | | | | | | | Cr Ca | | | | | | | | | | | | | | | |
| 12 | | | | | | | Cr | | | | Cr Ca | | Cr Ca | Cr Ca | | | | | | | | | | | | | |
| 13 | | | | | | | | | | Cr | Cr | | | | Cr | | | | | | | | | | | | Ca |
| 14 | | | | | | | | | | | | | | Cr Ca | | Cr | | | | | | | | | | | V_air |
| 15 | | | | | | | | | | | | | | | | Cr Hg | | | | | | | | | | | V_air V_air |
| 16 | | | | | | | | | | | | | | | | | | | | | | | | | | Ca | V_air |
| 17 | | | | | | | | | | | | | | | | | | Cr | Cr | | | | | | | | |
| 18 | | | | | | | | | | | | | | | | | | Ca | | Cr | Cr | | | | | | |
| 19 | | | | | | | | | | | | | | | | | | | | Cr | Cr | | | | | | |
| 20 | | Ca | | | | | | | Ca | | | | | | | | | | | Cr | | | | | Cr | | V_air |
| 21 | | | | | Ca | | V_oil | | | | | | | | | | | | | | Cr | | | | | | V_air |
| 22 | | | | | | | V_oil | | | | | | | | | | | | | | | Cr | | | | Cr | V_air |
| 23 | | | | | | | V_oil | | | | | | | | | | | | | | | | Cr | | Cr | | V_air |
| 24 | | | | | | | V_oil | | | | | | | | | | | | | | | | | Cr | | Cr | V_air |
| 25 | | | | | | | | | Ca | | | | | | | | | | | | | | | | Cr | Cr | V_air |
| 26 | | | | | | | | | | | | | | | | | | | | | | | | | | Cr | V_air |

METHOD OF THERMAL ANALYSIS OF A BEARING UNIT

CROSS-REFERENCE RELATED APPLICATIONS

This application is based on and claims priority to Italian Patent Application No. 102020000015169 filed on Jun. 25, 2020, under 35 U.S.C. § 119, the disclosure of which is incorporated by reference herein.

FIELD

The present invention relates to a method of thermal analysis of a bearing unit, preferably, but not necessarily, using spherical rolling elements.

BACKGROUND

As is known, bearing units are used to enable one component or unit to move relative to another component or unit. The bearing unit usually has a first component, for example a radially inner ring, that is fastened to a first component, for example a shaft, and a second component, for example a radially outer ring, that is fastened to a second component, for example a housing. Depending on the application, the radially inner ring can be rotary while the radially outer ring is stationary, but many other applications provide for the outer element to rotate and the inner element to be stationary. In any case, the rotation of one ring in relation to the other inside the rolling bearing unit is enabled by a plurality of rolling elements that are positioned between the cylindrical surface of one component and the cylindrical surface of the second component, normally referred to as raceways. The rolling elements can be balls, cylindrical or conical rollers, needle rollers and similar rolling elements.

DESCRIPTION OF THE DRAWINGS

Exemplary embodiments are described below with reference to the attached drawings, in which:

FIG. 5 is a table showing the thermal interaction between the different isothermal nodes.

DETAILED DESCRIPTION

As the art has evolved, bearing units have been expected to provide increasingly high performance levels in terms of rotational speed and temperature. Such requirements can be incompatible with the thermomechanical limits of the bearing unit, and in particular of some of the non-metallic components thereof, such as the cage of the rolling elements and the seals that protect the rolling elements and raceways from external contaminants.

In order to provide bearing units with higher performance levels without risking failure in the field, estimating the operating temperature and checking speed limits is identified as a fundamental aspect of analysis of a bearing application. Furthermore, these factors are interdependent on many other factors, such as the dimensions of the bearings, loads and lubrication conditions. Known techniques are only capable of providing partial results and notably do not include estimates of the actual dissipation of heat in the specific application.

The operating temperature of a bearing reaches a steady state when there is thermal equilibrium, or when there is an equilibrium between generated heat and dissipated heat. However, the known techniques employ a simplified valuation of the thermal equilibrium under very precise operating conditions without taking into account other factors.

Furthermore, the technical literature recommends calculating the maximum allowable regulated speed in the application to determine the load of the application and the specific lubricant. However, the known calculation methods do not include data relating to the actual dissipation of heat in the specific application. Consequently, a detailed thermal analysis is required in order to include the effects of heat dissipation.

There is therefore a need to define a method of thermal analysis of a bearing unit that resolves the drawbacks and lack of information in the prior art and that enables the design of bearing units that are both high performance and reliable.

A method is disclosed, which is based on the theory of Hertzian contacts and a calculation model of friction forces, uses finite-difference methods to estimate the temperature range in the bearing unit and on the elements in contact with the bearing unit, for example a shaft and a housing. This enables the temperature range to be checked with the thermomechanical limits of the components of the bearing unit to determine the maximum speed at which the bearing unit can be used safely.

One embodiment of a bearing unit in accordance with this disclosure is described below purely by way of example and with reference to the aforementioned figures.

Figure 1:
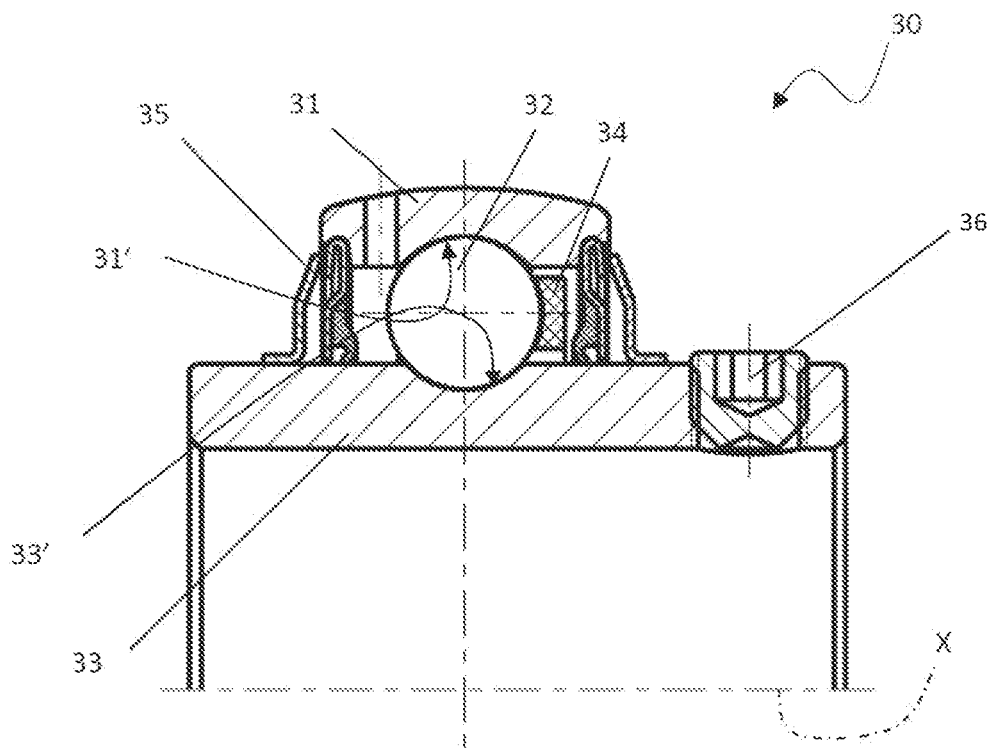
FIG. 1 is a cross section view of an example embodiment of a bearing unit suitable for application of the method according to one embodiment of the present invention.
Figure 2:
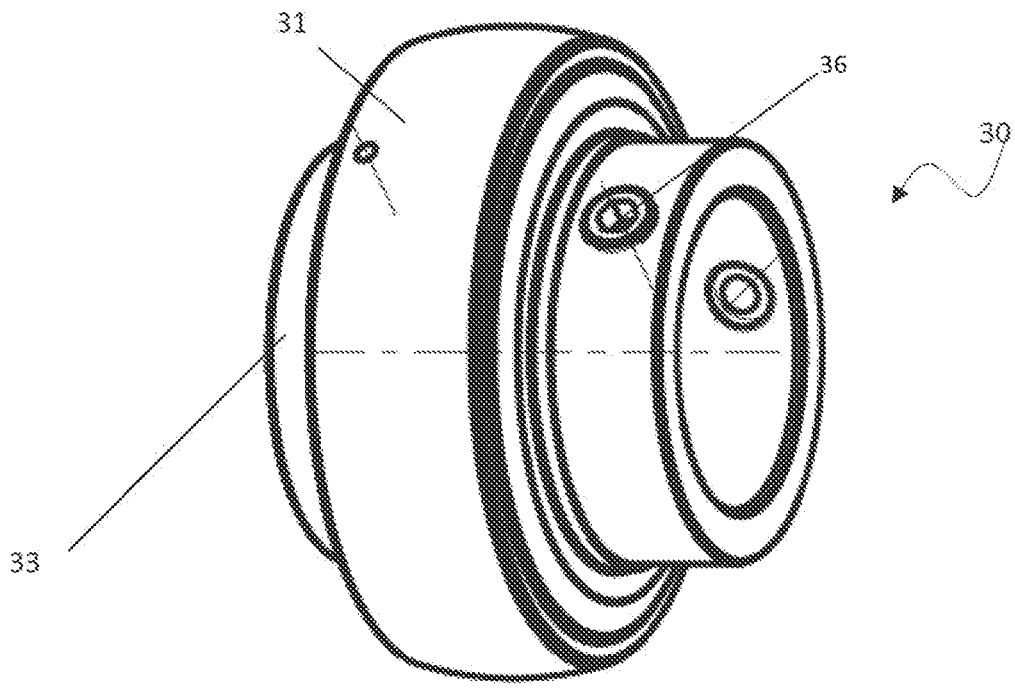
FIG. 2 is a an axonometric view of the bearing unit in FIG. 1.

With specific reference to FIGS. 1 and 2, the bearing unit 30 for use in the agricultural sector and/or manufacturing industry (for example the textile, mining, motor-vehicle or food industries) can be interposed for example between a rotary shaft and a housing element (not covered by the present invention) and includes a radially outer ring 31 that is preferably but not necessarily stationary, a radially inner ring 33 that is preferably but not necessarily rotary about a central axis of rotation X of the bearing unit 30, at least one row of rolling elements 32, in this example balls, interposed between the radially outer ring 31 and the radially inner ring 33, at least one cage 34 for the rolling elements to hold the rolling elements of the row of rolling members 32 in position, and at least one fastening element 36 to lock the radially inner ring on the shaft.

Throughout the present description and the claims, terms and expressions indicating position and orientation, such as "radial" and "axial", should be understood with reference to the central axis of rotation X of the bearing unit 30.

The radially outer ring 31 is provided with a radially outer raceway 31', while the radially inner ring 33 is provided with at least one radially inner raceway 33' to enable the row of rolling elements 32 interposed between the radially outer ring 31 and the radially inner ring 33 to roll. To simplify the graphical representation, reference sign 32 is used to denote both individual balls and the row of balls. Again for the sake of simplicity, the term "ball" shall be used by way of example in the present description and in the attached drawing instead of the more generic term "rolling element", and the same reference signs shall be used. Some example embodiments and the related drawings may include the use of rolling elements other than balls (for example rollers) without thereby moving outside the scope of the present invention.

A bearing unit 30 is also provided with sealing means 35 to seal the bearing unit from the external environment. Hereinafter, a sealing means 35 can also be referred to more simply as seals 35, and shall be understood to refer to the same component. Sealing means 35 usually comprise a metal screen with one or more contact lips made of elastomeric material that come into sliding contact with the ring of the bearing unit in relative motion to the seals themselves. In other possible embodiments, a sealing means includes a first seal and a second seal, and the sliding contact occurs between at least two lips, the first lip belonging to the first seal and the second lip belonging to the second seal.

A method of thermal analysis of the bearing unit as described above is based on an appropriate discretization of the system.

Indeed, on account of the discontinuous structure of the bearing unit 30, the conventional methods for analysing the transfer of heat are not suitable for analysing the temperature range of the system. Instead, finite-difference methods should be used to obtain a mathematical solution.

Figure 3:
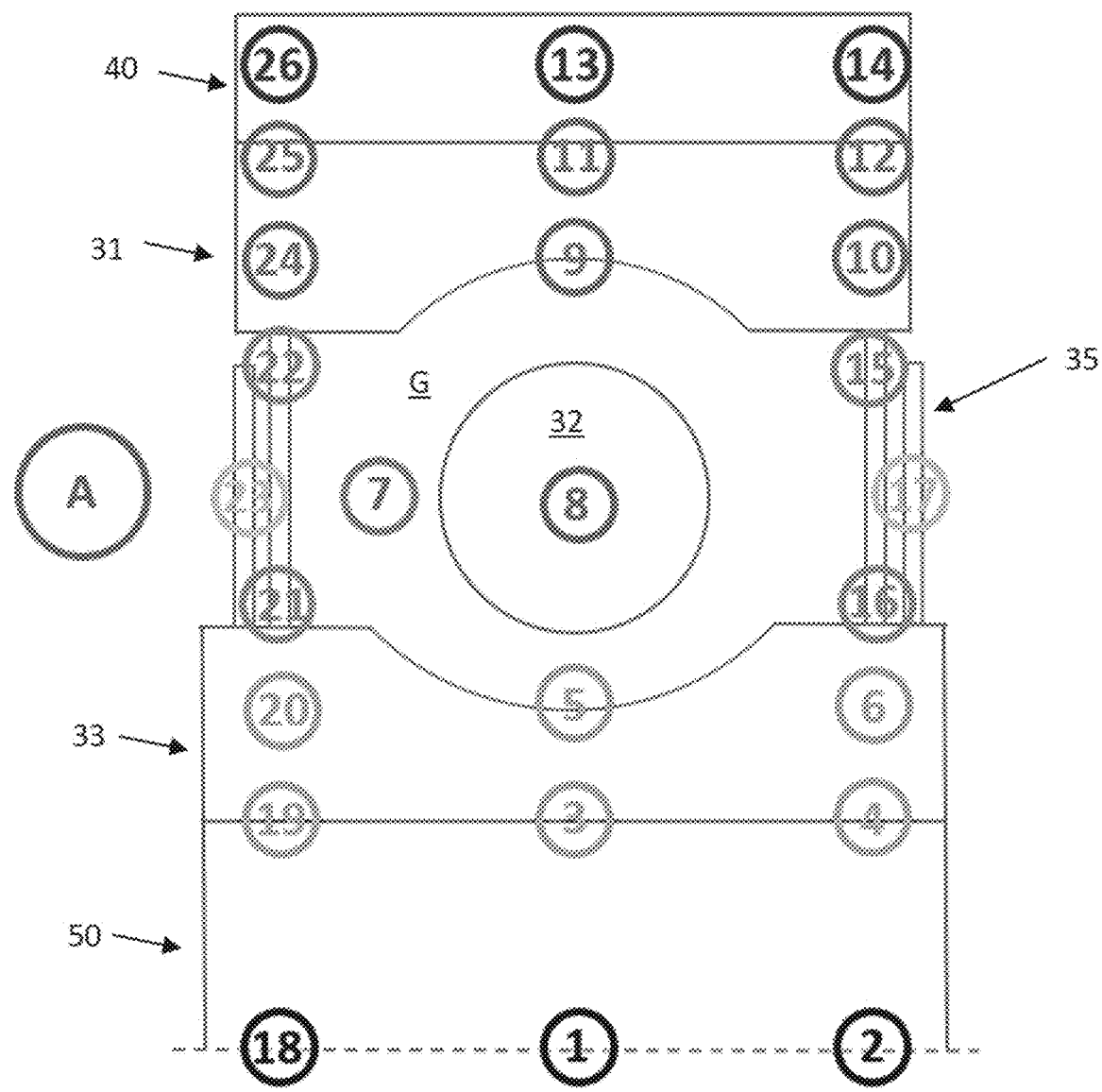
FIG. 3 is a schematic view of the bearing unit in FIG. 1, coupled to a shaft and a housing and discretized over a plurality of isothermal nodes to which the method of thermal analysis according to the present invention is applied.

With reference to FIG. 3, the bearing unit 30 is discretized into a set of isothermal elements represented by isothermal nodes, each of which is characterised by the thermal resistance thereof. The system of isothermal nodes is designed to analyse the heat transfer process and the temperature distribution in the system. In the example in FIG. 3 there are 26 isothermal nodes (hereinafter referred to more simply as nodes), indicated using reference signs 1 to 26. In particular, the discretized model includes the bearing unit 30 and specifically the radially outer ring 31, the rolling elements 32, the radially inner ring 33 and the seals 35. The model also includes the elements in direct contact therewith, specifically a housing 40 surrounding the radially outer ring 31 and a shaft 50 on which is seated the radially inner ring 33, the lubricating grease G inside the bearing unit (node 7) and the external environment (reference sign A). As shown in FIG. 3, the isothermal nodes characterize either a portion of an element (for example: nodes 6 and 20 representing the radially inner ring 33 or nodes 10 and 24 representing the radially outer ring) or an interface between elements in contact (for example nodes 3, 4, 19 representing the interface between the shaft 50 and the radially inner ring 33, while the nodes 11, 12, 25 represent the interface between the housing 40 and the radially outer ring 31).

Ultimately, a "network" of thermal resistance elements has been used to represent the bearing unit 30, while the rolling elements 32 and the raceways 32', 33' have been modelled as concentrated thermal masses connected by thermal resistances.

The heat transfer coefficients of the system principally include the heat conduction coefficients between the components and the convective heat transfer coefficients of the lubricating grease G and the air A in the external environment. Heat conduction is the most simple means of heat transfer and can be expressed as a linear function of the temperature difference between solid elements in contact. However, the conduction of heat through micro-contacts between the rolling elements 32 and the raceways 31', 33' requires more complex modelling.

The physical characteristics of the lubricating grease and the external air determine the variability of the convective heat transfer coefficient, while the importance of the lubricating grease G is reflected not only in the process of heat generation by friction of the bearing of the insert, but also in the state of heat transfer during the heat transfer process.

Figure 4:
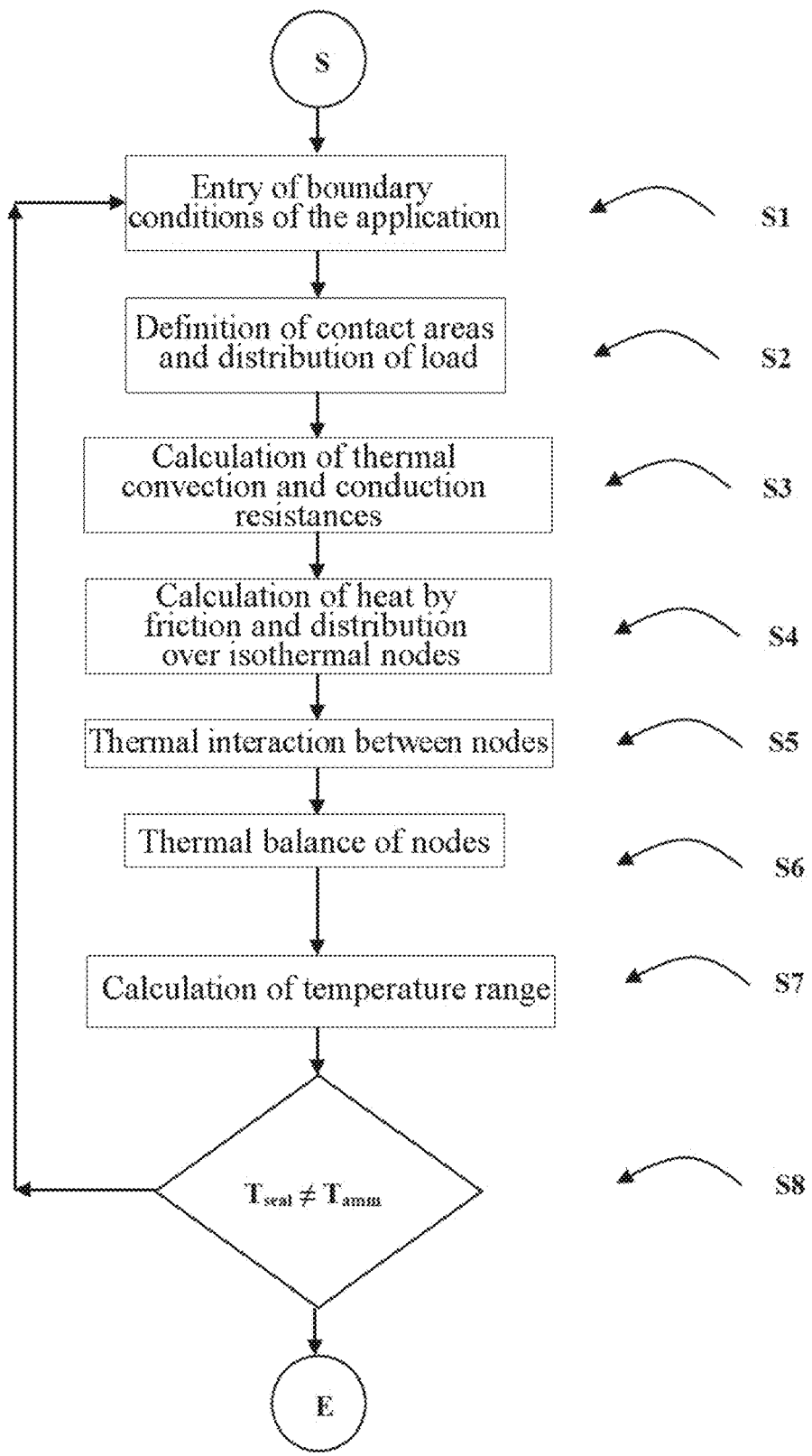
FIG. 4 is a flow chart of the method of thermal analysis of a bearing unit according to one embodiment of the present invention.

FIG. 4 shows respectively the sequence of the steps of the thermal analysis method of the bearing unit 30 according to one embodiment of the present invention. In detail, the thermal analysis method includes the following steps:

S1: Entering the input and boundary conditions of the application. In this step, the main input and boundary conditions to be taken into account are the angular speed of the shaft, the materials of the components of the bearing unit 30 (including the non-metallic materials of the cage 34 and of the seal 35), the materials of the housing 40 and of the shaft 50, the characteristics of the lubricating grease G and of the external environment A, as well as the geometry of the components of the bearing unit 30 and the loads applied, S2: Definition of contact areas and load distribution. On the basis of the input conditions defined in step S1, this step determines the contact areas between the different elements of the bearing unit, in particular between the rolling elements 32 and the raceways 31', 33', and the distribution of loads. By way of example, the Hertz theory can be used to determine the elastic deformation and the distribution of stresses in the contact areas between the rolling elements and the respective raceways. The Hertz theory and the related equations (which are known and therefore not detailed) are based on the assumptions that the materials of the two bodies in contact are homogeneous and isotropic, that both of the contact surfaces are ideally smooth and frictionless, that the yield stresses of the materials are not exceeded (thereby enabling elastic deformation alone to be considered), that it is possible to consider only normal stresses (in this case, radial stresses) and to disregard shearing stresses, and finally that the radii of curvature of the contact areas are very large compared to the dimensions of these areas. In the bearing units, the contact between the rolling elements and the raceways occurs at a single point in the absence of load, whereas contact occurs over a finite area that is generally elliptical in the presence of load. The Hertz theory makes it possible to determine the distribution of pressures between the contact areas, the maximum deformation in the direction normal to the contact areas, and therefore the maximum radial deformation and the shearing stresses. The thermal analysis method according to the present invention also makes it possible to consider cases in which the Hertz theory is not applicable, for example as a result of surface defects (scratches, bulging, etc.) or surface roughness. In such cases, the method uses algorithms that can take account of micro-contacts and consequent irregular pressure distributions with peak values. It has nonetheless been verified that the Hertz theory provides satisfactory results, in particular when the bearing units are not new since the application of loads reduces both the size of surface defects and surface roughness over time.

S3: Calculation of thermal convection and conduction resistances. In this third step, the geometry of the components of the bearing unit being known, the thermal and thermal-convection and thermal-conduction resistances are calculated. Formulas known in the technical literature are used. The heat conduction is described as a linear function of the difference in temperature level inside a solid structure. In particular, in the case of cylindrical elements such as the radially outer ring 31 and the radially inner ring 33, the structures are modelled as cylindrical structures and formulas are used to determine the radial conduction thermal resistances and the axial conduction thermal resistances. Furthermore, also on the basis of the results obtained in step S2 in particular, the size of the contact areas (linked to Hertzian stresses) between the rolling elements 32 and the raceways 31', 33' makes it possible to determine the thermal contact resistance between said elements. It is also important to determine the thermal convection resistances caused by the effect of the relative speed between the air A from the external environment and the lubricating grease on one hand and the elements of the bearing unit 30 (raceways 31', 33', rolling elements 32, seals 35) on the other hand. It should be noted that the coefficient of the heat transfer film is a function of multiple parameters, all of which can be determined from the input data (bearing speed, materials, properties of the lubricating grease): surface and fluid temperature, thermal conductivity of the fluid, speed of the fluid adjacent to the surface, dimensions and aspect of the surface, viscosity and density of the fluid. Many of these properties are dependent on temperature and therefore thermal convection is not a linear function of temperature unless the properties of the fluid can be considered to be reasonably steady over a finite temperature range. Formulas known from the literature and/or empirical formulas can also be used in this case to calculate the convective heat exchange coefficients for the lubricating grease and the air from the external environment.

S4: Calculation of friction heat and distribution over isothermal nodes. In this step, again on the basis of the input data from step S1, the heat generated by friction between the elements in contact of the bearing unit 30 can be calculated. As is known, friction in the bearing unit represents a loss of power manifested in the form of heat generation that needs to be efficiently removed. In order to calculate the total moment of friction in a bearing unit, the rolling frictional moment and the sliding frictional moment between the rolling elements 32 and the raceways 31', 33' need to be taken into account, along with the sliding frictional moment between the seals 35 and the ring of the bearing unit in relative motion with the seals. The input conditions defined in step S1 enable all of the fundamental parameters required to calculate the heat generated by friction to be taken into account: type of lubricating grease, seal type and dimensions, operating temperature and speed, radial and axial loads. Furthermore, all of the sources of heat generated by friction can be precisely located on the appropriately defined isothermal nodes. This provides the position of the source of friction (and therefore the generated heat) on the node representing the contact where the heat is generated.

S5: Thermal interaction between nodes. On account of the manner in which the nodes are defined, each node interacts thermally with the adjacent nodes (according to the diagram in FIG. 6, which is further discussed below). The mutual interaction between the nodes is shown in the table in FIG. 5. The table refers, by way of example, to a given configuration of the bearing unit 30, but can be easily adapted to any other useful configuration. The symbols used in FIG. 5 are explained below:

"C_r" is radial conduction,

"C_a" is axial conduction,

"V_oil" is the share of heat exchange by convection caused by the base oil of the lubricating grease. It should be noted that the lubricating grease has a solid matrix plus a base oil. The grease interposed between the raceways and the rolling elements is substantially the solid matrix. In principle therefore, a share of the heat exchange related to conduction should also be taken into consideration. Since, in practical terms, this contribution would be negligible compared to the contribution of the convective heat exchange, it was preferred not to take the contribution of the heat exchange related to conduction into consideration, in order to simplify the calculation model in the method according to the present invention.

"V_air" is the convection caused by air,

"H_g" is the heat generated.

Figure 6:
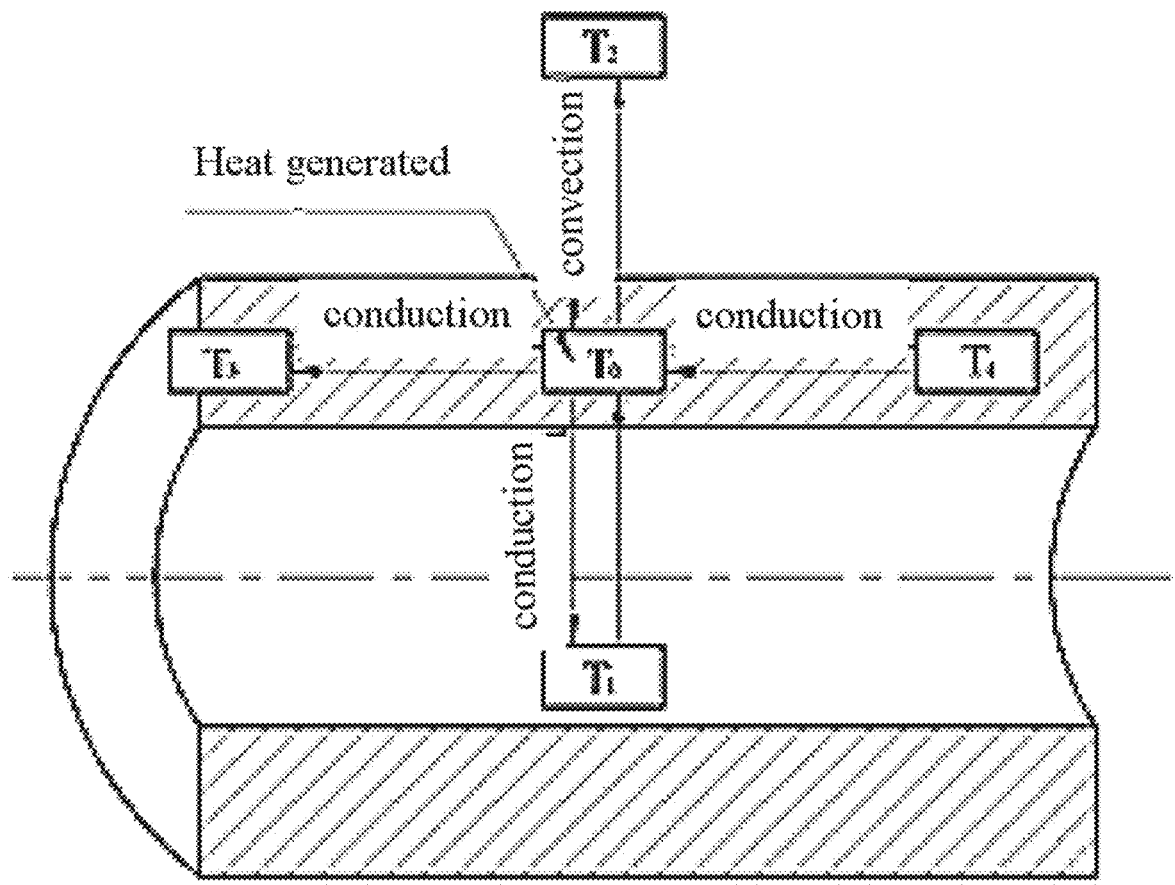
FIG. 6 is a diagram of an isothermal node used in the method in FIG. 4 of thermal analysis of a bearing unit.

S6: Thermal balance of nodes. In this stage, the initial temperatures and conditions are set for all of the 26 selected nodes to analyse the heat transfer model of the system. Given the complexity of the calculation process, in this exemplary embodiment, it is assumed that 26 temperature nodes adequately describe the system. The system of isothermal nodes is shown schematically using coaxial cylindrical elements, as shown in FIG. 6. In the aforementioned figure, the selected node 0 has a temperature $T_0$ determined by the temperatures $T_1$, $T_2$, $T_3$, $T_4$ of the adjacent nodes 1, 2, 3, 4 and by the related heat exchanges. The general form of the energy balance for any temperature node is:

$$H_{f0} + H_{1-0,c} + H_{2-0,v} + H_{3-O,c} + H_{4-O,c} = m_0 c \frac{\partial T}{\partial t}$$

where, in addition to the indices 0, 1, 2, 3, 4 of the different nodes:

m is the mass of the lubricating grease c is the conductive heat transfer coefficient v is the convective heat transfer coefficient T is the temperature at the generic calculation instant t is the time at the generic calculation instant $H_{f0}$ is the heat generated by friction in node 0

$H_{(1-0,\ c)}$ is the conductive heat exchange between nodes 0-1

$H_{(2-0,\ v)}$ is the convective heat exchange between the nodes 0-2

$H_{(3-O,\ c)}$ is the conductive heat exchange between nodes 0-3

$H_{(4-O,\ c)}$ is the conductive heat exchange between nodes 0-4

S7: Calculation of the temperature range. Once the thermal balance equation of the individual nodes has been established, the next step of the thermal analysis method provides for the calculation of the temperature range of the entire system. Indeed, using the thermal balance of all of the isothermal nodes of the system comprising the bearing unit 30, the housing 40, the shaft 50, the lubricating grease G and the air A from the external environment, it is possible to draw up 26 partial differential equations that are similar to the equation above, in which the unknown quantities are the temperatures of each individual isothermal node.

S8: $T_{seal} \neq T_{amm}$. It is known from technical experience that the elastomer lips of the seal 35 are the most heat-critical elements of the entire bearing unit. The model confirms these data and therefore the final verification is made by comparing the resulting operating temperature on the reference node of the seal (in FIG. 3, nodes 16 and 21) and the related maximum allowable continuous temperature. If the resulting operating temperature on the reference node of the seal is not equal to the maximum allowable continuous temperature thereof, the algorithm is repeated from step S1 to step S8 until convergence is achieved. This iterative approach of the analysis provides an optimum speed index on the basis of the thermomechanical limits of the components of the bearing.

Ultimately, this thermal analysis method, including a thermomechanical coupling model and a heat transfer model, can be used to analyse the stationary thermal characteristics of the bearing unit, discretizing same in a finite number of isothermal nodes. This method makes it possible to analyse the influence of the main factors: loads applied, state of the lubricating grease, morphology of the contact surfaces, geometry and characteristics of the seals, rotational speed, etc.

The heat transfer model can be used to estimate critical parameters such as thermal contact resistance between the rolling element and the raceway, the convective heat transfer coefficient of the cooling system (external air) and of the grease.

In terms of the specific analysis of the application, the main advantage is knowing the temperature range inside the bearing unit. This knowledge in turn makes it possible to check the speed limit of the bearing unit, and therefore the suitability thereof for the specific application. Conversely, determining the speed on the basis of the requirements of the application makes it possible to check the temperature range of the unit and therefore to check whether a component is heat critical.

In addition to the embodiments described above, numerous other variants of the invention are possible. Such embodiments should be understood to be examples and do not limit the scope, applications or possible configurations of the invention. Indeed, although the description provided above enables the person skilled in the art to carry out the present invention at least according to one example configuration thereof, numerous variations of the components described could be used without thereby moving outside the scope of the invention, as defined in the attached claims interpreted literally and/or according to the legal equivalents of same.

The objective of the present disclosure is to establish a method of performing thermal analysis of a bearing unit in order to safely determine the limit speed thereof. The method takes into account all of the operating and boundary conditions of the bearing unit, in particular the effects of the radial load, the axial load, the centrifugal force, the characteristics of the material and the state of lubrication.

Furthermore, by using the theory of heat transfer, the method provides a mathematical model for the temperature range of the bearing unit and analyses the effect of the technology of the sealing system and the heat dissipation from the structure on the temperature range of the bearing unit.

The method makes it possible to identify the most heat-critical component of the bearing unit, and thereby to set the maximum permissible rotational speed on the basis of the thermomechanical limits of the most critical component. The method and the results obtained have been checked using an extensive campaign of experimental tests, and the comparison unequivocally validates the thermal analysis technique.

Consequently, the present invention provides for a method of thermal analysis of a bearing unit having the features set out in the attached method claims.

According to another objective, the method can be applied to a bearing unit having the features set out in the attached product claims.

Figure 7:
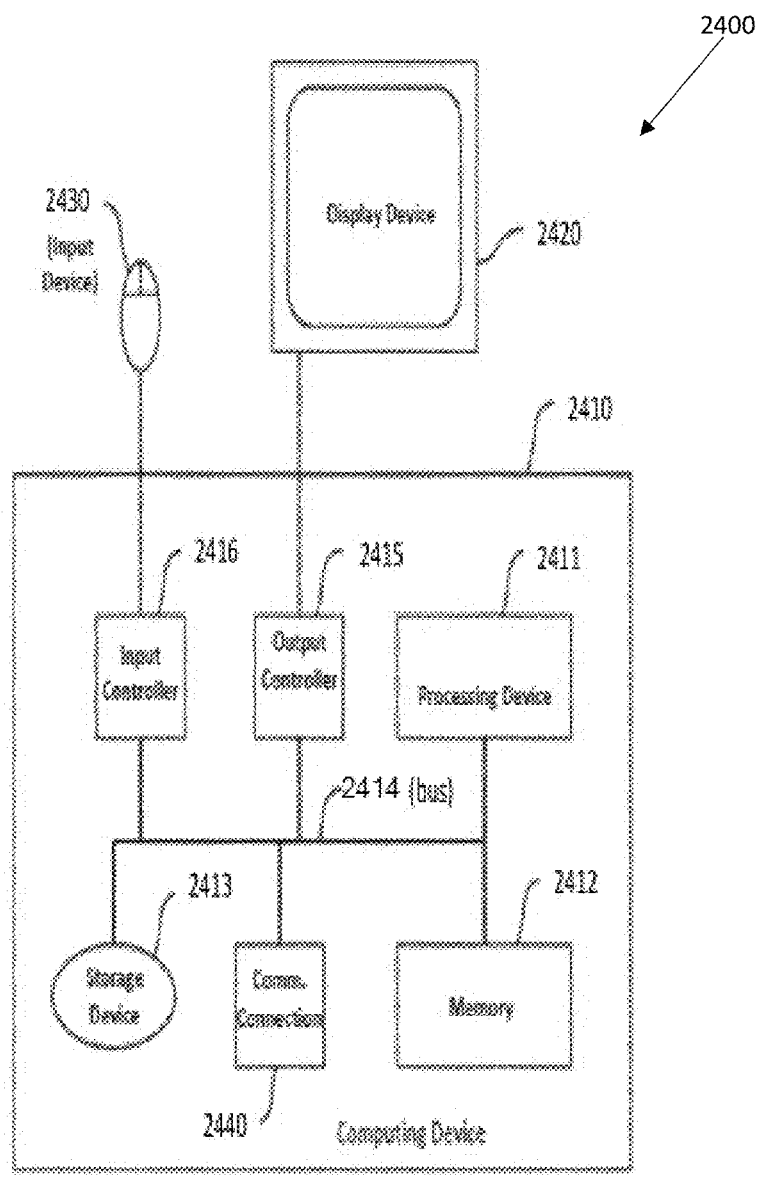
FIG. 7 shows an exemplary computing device in accordance with this disclosure.

Furthermore, a thermal analyser is disclosed. A thermal analyser, e.g., 2400 includes a system for performing methods in accordance with this disclosure. FIG. 7 illustrates a computing device 2410 in accordance with this disclosure, which includes a processing device 2411, memory 2412, a bus network 2414, an output controller 2415 providing output to an output device 2420, such as a display or a printer (not particularly illustrated), a storage device 2413, a communications connection 2440, e.g., for wireless or wired connectivity, and an input controller 2416 for receiving user input, e.g., via a user device 2430. In some embodiments, computer software instructions for executing methods in accordance with this disclosure are retrieve from storage device 2413 by processing device 2411 via bus 2414 and stored in memory 2412, from which processing device 2411 executes such instructions causing computing device 2410 overall to carry out various techniques in accordance with this disclosure.

In general, upon reading this disclosure one will appreciate that there are many ways to configure a computing device, e.g., 2412, to create a thermal analyzer, e.g., 2400. For example, upon fully comprehending this disclosure one could prepare computer readable instructions embodying the techniques disclosed herein. In one exemplary embodiment thermal analyzer, e.g., 2400, includes a storage device, e.g., 2413 storing instructions for carrying out a method in accordance with the method illustrated by FIG. 4. In embodiments, analyzer 2400 so configured is a means of performing thermal analysis on a bearing unit.

The invention claimed is:

1. A method executed by one or more computing devices for thermal analysis of a bearing unit, the method comprising:
   a. receiving, using at least one computer processor, input and boundary conditions of an application,
   b. defining, using at least one computer processor, contact areas and load distribution between components of the bearing unit,
   c. generating, using at least one computer processor, a set of conduction resistances and a set of thermal convections of components of the bearing unit respectively,
   d. generating, using at least one computer processor, a heat generated by friction between the components which are in contact with each other at the contact areas between components and a heat distribution on a plurality of isothermal nodes which discretize the bearing unit, wherein the plurality of isothermal nodes comprises twenty-six isothermal nodes,
   e. defining, using at least one computer processor, a thermal interaction between the plurality of isothermal nodes,
   f. performing, using at least one computer processor, thermal balancing the plurality of isothermal nodes,
   g. generating, using at least one computer processor, a temperature range of the bearing unit, h. comparing, using at least one computer processor, resulting operating temperature on an isothermal node of a sealing device of the bearing unit and a relative maximum allowable temperature, and if the operating temperature and the relative maximum allowable temperature values are different from each other, repeat the method from step a. to step h, wherein the bearing unit comprises a radially inner ring and a radially outer ring and the sealing device comprises at least one contacting lip in sliding contact with one of the radially inner ring and the radially outer ring.

2. The method of claim 1, wherein in step a. receiving the input and boundary conditions of the application include receiving an angular speed of a shaft, materials of the components, materials of a housing, materials of the shaft, characteristics of a lubricating grease (G), characteristics of air (A) from the external environment, geometry of the components of the bearing unit, and loads applied.

3. The method of claim 1, wherein in step b. defining of contact areas and load distribution between the different components of the bearing unit includes areas in contact between the rolling elements and the raceways and the loads distribution.

4. The method of claim 1, wherein in step c. generating the conduction resistances of the components of the bearing unit includes radial conduction thermal resistances and axial conduction thermal resistances.

5. The method of claim 1, wherein in step c. generating the thermal convection of the components of the bearing unit includes the determination of thermal convection resistances which are caused by the effect of the relative speed between air (A) of the external environment, lubricating grease (G) and components of the bearing unit.

6. The method of claim 1, wherein in step d. the heat generated by friction between the bearing unit components at the contact areas between components includes rolling frictional moment and sliding frictional moment between rolling elements and raceways and sliding frictional moment between a seal and a ring of a bearing unit in relative motion with respect to the seal.

7. The method of claim 1, wherein in step f. performing thermal balance of the isothermal nodes is performed in accordance with an energy balance equation for each isothermal node equal to:

$$H_{f0} + H_{1-O,c} + H_{2-0,v} + H_{3-O,c} + H_{4-O,c} = m_0 c \frac{\partial T}{\partial t}$$

where, in addition to the indices 0, 1, 2, 3, 4 of the different nodes:
m is the mass of the lubricating grease
c is the conductive heat transfer coefficient
v is the convective heat transfer coefficient
T is the temperature at the generic calculation instant
t is the time at the generic calculation instant
Hf0 is the heat generated by friction in node 0
H (1-0, c) is the conductive heat exchange between nodes 0-1
H (2-0, v) is the convective heat exchange between the nodes 0-2
H (3-0, c) is the conductive heat exchange between the nodes 0-3
H (4-0, c) is the conductive heat exchange between nodes 0-4.

8. The method of claim 1, wherein in step g. generating the temperature range includes generating a temperature for each individual isothermal node respectively.

9. A bearing unit comprising:
a radially outer ring comprising a radially outer raceway
a radially inner ring comprising at least one radially internal raceway,
at least one row of rolling elements interposed between the radially outer ring and the radially inner ring,
sealing means to seal the bearing unit from the external environment,
the bearing unit being suitable for applying a method according to claim 1.

10. A thermal analyser including a system, comprising:
one or more processors coupled to a non-transitory computer readable media comprising computer readable instructions stored thereon, which when executed by the one or more processors cause the one or more processors to perform operations comprising:
a. receiving input and boundary conditions of an application,
b. defining contact areas and load distribution between components of the bearing unit,
c. generating a set of conduction resistances and a set of thermal convections of components of the bearing unit respectively,
d. generating a heat generated by friction between the components which are in contact with each other at the contact areas between components and a heat distribution on a plurality of isothermal nodes which discretize the bearing unit, wherein the plurality of isothermal nodes comprises twenty-six isothermal nodes,
e. defining a thermal interaction between the plurality of isothermal nodes,
f. performing thermal balancing the plurality of isothermal nodes,
g. generating a temperature range of the bearing unit,
h. comparing resulting operating temperature on an isothermal node of a sealing device of the bearing unit and a relative maximum allowable temperature, and if the operating temperature and the relative maximum allowable temperature values are different from each other, repeat the method from step a. to step h, wherein the bearing unit comprises a radially inner ring and a radially outer ring and the sealing device comprises at least one contacting lip in sliding contact with one of the radially inner ring and the radially outer ring.

11. The thermal analyser of claim 10, wherein in step a. receiving the input and boundary conditions of the application include receiving an angular speed of a shaft, materials of the components, materials of a housing, materials of the shaft, characteristics of a lubricating grease (G), characteristics of air (A) from the external environment, geometry of the components of the bearing unit, and loads applied.

12. The thermal analyser of claim 10, wherein in step b. defining of contact areas and load distribution between the different components of the bearing unit includes areas in contact between the rolling elements and the raceways and the loads distribution.

13. The thermal analyser of claim 10, wherein in step c. generating the conduction resistances of the components of the bearing unit includes radial conduction thermal resistances and axial conduction thermal resistances.

14. The thermal analyser of claim 10, wherein in step c. generating the thermal convection of the components of the bearing unit includes the determination of thermal convection resistances which are caused by the effect of the relative speed between air (A) of the external environment, lubricating grease (G) and components of the bearing unit.

15. The thermal analyser of claim 10, wherein in step d. the heat generated by friction between the bearing unit components at the contact areas between components includes rolling frictional moment and sliding frictional moment between rolling elements and raceways and sliding frictional moment between a seal and a ring of a bearing unit in relative motion with respect to the seal.

16. The thermal analyser of claim 10, wherein in step f performing thermal balance of the isothermal nodes is performed in accordance with an energy balance equation for each isothermal node equal to:

$$H_{f0} + H_{1-O,c} + H_{2-0,v} + H_{3-O,c} + H_{4-O,c} = m_0 c \frac{\partial T}{\partial t}$$

where, in addition to the indices 0, 1, 2, 3, 4 of the different nodes:
m is the mass of the lubricating grease
c is the conductive heat transfer coefficient
v is the convective heat transfer coefficient
T is the temperature at the generic calculation instant
t is the time at the generic calculation instant
Hf0 is the heat generated by friction in node 0
H (1-0, c) is the conductive heat exchange between nodes 0-1
H (2-0, v) is the convective heat exchange between the nodes 0-2
H (3-0, c) is the conductive heat exchange between the nodes 0-3
H (4-0, c) is the conductive heat exchange between nodes 0-4.

17. The thermal analyser of claim 10, wherein in step g. generating the temperature range includes generating a temperature for each individual isothermal node respectively.

18. A non-transitory computer readable medium comprising computer readable instructions stored thereon, which when executed by at least one computer processor cause the at least one computer processor to carry out operations comprising:

a. receiving input and boundary conditions of an application, b. defining contact areas and load distribution between components of the bearing unit, c. generating a set of conduction resistances and a set of thermal convections of components of the bearing unit respectively, d. generating a heat generated by friction between the components which are in contact with each other at the contact areas between components and a heat distribution on a plurality of isothermal nodes which discretize the bearing unit, wherein the plurality of isothermal nodes comprises twenty-six isothermal nodes, e. defining a thermal interaction between the plurality of isothermal nodes, f. performing thermal balancing the plurality of isothermal nodes, g. generating a temperature range of the bearing unit, h. comparing resulting operating temperature on an isothermal node of a sealing device of the bearing unit and a relative maximum allowable temperature, and if the operating temperature and the relative maximum allowable temperature values are different from each other, repeat the method from step a. to step h, wherein the bearing unit comprises a radially inner ring and a radially outer ring and the sealing device comprises at least one contacting lip in sliding contact with one of the radially inner ring and the radially outer ring.

* * * * *